(12) United States Patent
Bzowej et al.

(10) Patent No.: US 12,195,586 B2
(45) Date of Patent: Jan. 14, 2025

(54) CHARGE CONTROL AGENTS AND PARTICLE DISPERSIONS INCLUDING THE SAME

(71) Applicant: E Ink Corporation, Billerica, MA (US)

(72) Inventors: Eugene Bzowej, Reading, MA (US); John L Marshall, Sedgwick, ME (US); Stephen J. Telfer, Arlington, MA (US); Brandon Macdonald, Melrose, MA (US)

(73) Assignee: E Ink Corporation, Billerica, MA (US)

( * ) Notice: Subject to any disclaimer, the term of this patent is extended or adjusted under 35 U.S.C. 154(b) by 1283 days.

(21) Appl. No.: 16/864,430

(22) Filed: May 1, 2020

(65) Prior Publication Data

US 2020/0355978 A1 Nov. 12, 2020

Related U.S. Application Data

(60) Provisional application No. 62/846,304, filed on May 10, 2019.

(51) Int. Cl.
| | | |
|---|---|---|
| *G02F 1/1675* | (2019.01) | |
| *C08G 63/68* | (2006.01) | |
| *C08G 69/08* | (2006.01) | |
| *C09B 67/46* | (2006.01) | |
| *G03G 9/097* | (2006.01) | |
| *G09G 3/20* | (2006.01) | |

(Continued)

(52) U.S. Cl.
CPC ............. *C08G 63/68* (2013.01); *C08G 69/08* (2013.01); *C09B 67/009* (2013.01); *G03G 9/09758* (2013.01); *G02F 1/167* (2013.01); *G02F 2001/1678* (2013.01); *G02F 2202/022* (2013.01)

(58) Field of Classification Search
None
See application file for complete search history.

(56) References Cited

U.S. PATENT DOCUMENTS

| | | |
|---|---|---|
| 2,800,457 A | 7/1957 | Barrett et al. |
| 4,001,140 A | 1/1977 | Foris et al. |

(Continued)

FOREIGN PATENT DOCUMENTS

| | | | |
|---|---|---|---|
| EP | 1116769 A2 | * | 7/2001 |
| JP | 2006-514073 A | * | 4/2006 |
| WO | 1993002042 A1 | | 2/1993 |

OTHER PUBLICATIONS

Korean Intellectual Property Office, PCT/US2020/030963, International Search Report and Written Opinion, Aug. 14, 2020.

(Continued)

*Primary Examiner* — Tae H Yoon
(74) *Attorney, Agent, or Firm* — Ioannis Constantinides (57) ABSTRACT

Mixtures are disclosed containing a plurality of charged pigment particles and a one or more charge control agents. At least one of the charge control agents has a chemical structure that includes a cationic head group, such as an ammonium cation or an iminium compound, and a non-ionic, polar functional group, other than an acyclic secondary amide group. The mixtures are useful as dispersions for forming electrophoretic media that may be incorporated into electrophoretic displays. Alternatively, the dispersions may be useful for forming electrophotographic toners and dispersions for other printing applications.

8 Claims, 4 Drawing Sheets

(51) Int. Cl.
 *G09G 3/34* (2006.01)
 *G02F 1/167* (2019.01)

(56) References Cited

U.S. PATENT DOCUMENTS

| | | | |
|---|---|---|---|
| 4,273,672 | A | 6/1981 | Vassiliades |
| 5,110,977 | A | 5/1992 | Wilson et al. |
| 5,187,037 | A | 2/1993 | Wilson et al. |
| 5,194,472 | A | 3/1993 | Wilson et al. |
| 5,516,616 | A | 5/1996 | Wilson et al. |
| 5,645,967 | A | 7/1997 | Sato et al. |
| 6,241,921 | B1 | 6/2001 | Jacobson et al. |
| 6,672,921 | B1 | 1/2004 | Liang et al. |
| 6,788,449 | B2 | 9/2004 | Liang et al. |
| 6,866,760 | B2 | 3/2005 | Paolini, Jr. et al. |
| 6,922,276 | B2 | 7/2005 | Zhang et al. |
| 6,930,818 | B1 | 8/2005 | Liang et al. |
| 6,982,178 | B2 | 1/2006 | LeCain et al. |
| 7,002,728 | B2 | 2/2006 | Pullen et al. |
| 7,012,600 | B2 | 3/2006 | Zehner et al. |
| 7,072,095 | B2 | 7/2006 | Liang et al. |
| 7,075,502 | B1 | 7/2006 | Drzaic et al. |
| 7,116,318 | B2 | 10/2006 | Amundson et al. |
| 7,144,942 | B2 | 12/2006 | Zang et al. |
| 7,170,670 | B2 | 1/2007 | Webber |
| 7,236,291 | B2 | 6/2007 | Kaga et al. |
| 7,312,784 | B2 | 12/2007 | Baucom et al. |
| 7,321,459 | B2 | 1/2008 | Masuda |
| 7,339,715 | B2 | 3/2008 | Webber et al. |
| 7,411,719 | B2 | 8/2008 | Paolini, Jr. et al. |
| 7,453,445 | B2 | 11/2008 | Amundson |
| 7,535,624 | B2 | 5/2009 | Amundson et al. |
| 7,561,324 | B2 | 7/2009 | Duthaler et al. |
| 7,679,814 | B2 | 3/2010 | Paolini, Jr. et al. |
| 7,715,088 | B2 | 5/2010 | Liang et al. |
| 7,839,564 | B2 | 11/2010 | Whitesides et al. |
| 8,009,348 | B2 | 8/2011 | Zehner et al. |
| 9,279,906 | B2 | 3/2016 | Kang |
| 9,921,451 | B2 | 3/2018 | Telfer et al. |
| 10,040,954 | B2 | 8/2018 | Du et al. |
| 10,444,553 | B2 | 10/2019 | Laxton |
| 2015/0005720 | A1 | 1/2015 | Zang |
| 2016/0012710 | A1 | 1/2016 | Lu et al. |
| 2017/0097556 | A1 | 4/2017 | Wu et al. |
| 2018/0002543 | A1* | 1/2018 | Du .................. C09D 5/448 |

OTHER PUBLICATIONS

European Patent Office, "Extended European Search Report", EP Appl. No. 20805540.0, Jul. 28, 2023.

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Gutcho, M.H., Microcapsules and Microencapsulation Techniques, Noyes Data Corp., Park Ridge NJ, (1976).

Vandegaer, J.E. (ed.), "Microencapsulation Processes and Applications", pp. v-x, 1-180 (Plenum Press, New York 1974).

* cited by examiner

CHARGE CONTROL AGENTS AND PARTICLE DISPERSIONS INCLUDING THE SAME

CROSS-REFERENCE TO RELATED APPLICATIONS

This application claims the benefit of and priority to U.S. Provisional Patent application having Ser. No. 62/846,304, filed on May 10, 2019, the contents of which are incorporated by reference herein in its entirety.

BACKGROUND OF INVENTION

Particle-based electrophoretic displays have been the subject of intense research and development for a number of years. In such displays, a plurality of charged particles (sometimes referred to as pigment particles) move through a fluid under the influence of an electric field. The electric field is typically provided by a conductive film or a transistor, such as a field-effect transistor. Electrophoretic displays have good brightness and contrast, wide viewing angles, state bistability, and low power consumption when compared with liquid crystal displays. Such electrophoretic displays have slower switching speeds than LCD displays, however, and electrophoretic displays are typically too slow to display real-time video. Additionally, the electrophoretic displays can be sluggish at low temperatures because the viscosity of the fluid limits the movement of the electrophoretic particles. Despite these shortcomings, electrophoretic displays can be found in everyday products such as electronic books (e-readers), mobile phones and mobile phone covers, smart cards, signs, watches, shelf labels, and flash drives.

A large body of patents and applications assigned to, or in the names of, the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Microcell structures, wall materials, and methods of forming microcells; see for example U.S. Pat. Nos. 7,072,095 and 9,279,906;
(d) Methods for filling and sealing microcells; see for example U.S. Pat. Nos. 7,144,942 and 7,715,088;
(e) Films and sub-assemblies containing electro-optic materials; see for example U.S. Pat. Nos. 6,982,178 and 7,839,564;
(f) Backplanes, adhesive layers and other auxiliary layers and methods used in displays; see for example U.S. Pat. Nos. 7,116,318 and 7,535,624;
(g) Color formation and color adjustment; see for example U.S. Pat. Nos. 7,075,502 and 7,839,564;
(h) Methods for driving displays; see for example U.S. Pat. Nos. 7,012,600 and 7,453,445;
(i) Applications of displays; see for example U.S. Pat. Nos. 7,312,784 and 8,009,348; and
(j) Non-electrophoretic displays, as described in U.S. Pat. No. 6,241,921 and U.S. Patent Applications Publication Nos. 2015/0277160; and applications of encapsulation and microcell technology other than displays; see for example U.S. Patent Application Publications Nos. 2015/0005720 and 2016/0012710.

Many commercial electrophoretic media essentially display only two colors, with a gradient between the black and white extremes, known as "grayscale". Such electrophoretic media either use a single type of electrophoretic particle having a first color in a colored fluid having a second, different color, or first and second types of electrophoretic particles having differing first and second colors in an uncolored fluid. In the former case, the first color is displayed when the particles lie adjacent the viewing surface of the display and the second color is displayed when the particles are spaced from the viewing surface. In the latter case, the first color is displayed when the first type of particles lie adjacent the viewing surface of the display and the second color is displayed when the second type of particles lie adjacent the viewing surface. Typically the two colors are black and white.

If a full color display is desired, a color filter array may be deposited over the viewing surface of the monochrome (black and white) display. Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen to be small enough, so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel. This is caused by the fact that white areas of the display are produced by displaying the one white sub-pixel out of each four, plus each colored sub-pixel in its colored form being equivalent to one third of a white sub-pixel. Thus, the three colored sub-pixels combined contribute no more than the one white sub-pixel. The brightness and saturation of colors is lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

A full color display may alternatively be provided by using an electrophoretic media containing multiple colored pigments having varying electrophoretic mobility. For example, U.S. Pat. No. 9,921,451 teaches a colored electrophoretic display that includes an electrophoretic medium which comprises one type of light-scattering particle (typically white) and three substantially non-light-scattering types of particles providing three subtractive primary colors. The use of substantially non-light-scattering particle types having subtractive primary colors allows mixing of colors and provides for more color outcomes at a single pixel than can be achieved with a color filter. Electrophoretic media and electrophoretic devices display complex behaviors, particularly those containing multiple set of charged pigments with varying charges and mobility. Complicated "waveforms" are needed to drive the particles between states. Compounded with the complexities of the electric fields, the mixture of particles (pigment) and fluid can exhibit unexpected behavior due to interactions between charged species and the surrounding environment (such as an encapsulation medium) upon the application of an electric field. Additionally, unexpected behaviors may result from impurities in the fluid, pigments, or encapsulation medium. For example, the charge on electrophoretic particles is normally controlled by adding a charge control agent (CCA) or surfactant to the electrophoretic medium; however, CCAs that are commercially sourced may have significant levels of impurities. Accordingly, it is difficult to predict how an electrophoretic display will respond to variations in the internal phase composition.

SUMMARY OF INVENTION

In one aspect, a mixture according to an embodiment of the invention comprises a plurality of charged particles and a first charge control agent comprising an ammonium cation and having a chemical structure represented by Formula I;

Formula I wherein m is 0, 1, 2, or 3; each R is independently selected from the group consisting of an alkyl group and an aryl group; wherein Z is one of a branched alkanediyl group, and an unbranched alkanediyl group; wherein n is an integer less than or equal to 20; wherein X is a moiety comprising a non-ionic, polar functional group other than an acyclic secondary amide group; and wherein HT is a hydrophobic moiety.

In another aspect, a mixture according to an embodiment of the invention comprises a plurality of charged particles and a first charge control agent comprising an ammonium cation and having a chemical structure represented by Formula II;

Formula II wherein R is an alkyl group or an aryl group; $R_1$, $R_2$ are independently selected from the group consisting of an alkyl group, an aryl group, and group $—[(Z)_n—X-HT]$; wherein Formula II comprises at least one $—[(Z)_n—X-HT]$; wherein group Z is one of a branched alkanediyl group, and an unbranched alkanediyl group; wherein n is an integer less than or equal to 20; wherein X is a moiety comprising a non-ionic, polar functional group other than an acyclic secondary amide group; and wherein HT is a hydrophobic moiety.

In another aspect, a mixture according to an embodiment of the invention comprises a plurality of charged particles and a first charge control agent comprising an ammonium cation and having a chemical structure represented by Formula III;

Formula III wherein R is an alkyl group or an aryl group; wherein $R_3$, $R_4$, and $R_5$ are independently selected from the group consisting of an alkyl group, an aryl group, and group $—[(Z)_n—X-HT]$; wherein Formula III comprises at least one $—[(Z)_n—X-HT]$ group; wherein Z is one of a branched alkanediyl group, and an unbranched alkanediyl group; wherein n is an integer less than or equal to 20; wherein X is a moiety comprising a non-ionic, polar functional group other than an acyclic secondary amide group; and wherein HT is a hydrophobic moiety.

In another aspect, a mixture according to an embodiment of the invention comprises a plurality of charged particles and a first charge control agent comprising an ammonium cation and having a chemical structure represented by Formula IV;

Formula IV wherein R is an alkyl group or an aryl group; wherein $R_6$, $R_7$, and $R_8$ are independently selected from the group consisting of an alkyl group, an aryl group, and group $—[(Z)_n—X-HT]$; wherein Formula IV comprises at least one $—[(Z)_n—X-HT]$ group; wherein Z is one of a branched alkanediyl group, and an unbranched alkanediyl group; wherein n is an integer less than or equal to 20; wherein X is a moiety comprising a non-ionic, polar functional group other than an acyclic secondary amide group; and wherein HT is a hydrophobic moiety.

In another aspect, a mixture according to an embodiment of the invention comprises a plurality of charged particles and a first charge control agent comprising an ammonium cation and having a chemical structure represented by Formula V;

Formula V wherein $R_9$, and $R_{10}$, are independently selected from the group consisting of an alkyl group, an aryl group, and group $—[(Z)_n—X-HT]$; wherein Formula V comprises at least one $—[(Z)_n—X-HT]$ group; wherein Z is one of a branched alkanediyl group, and an unbranched alkanediyl group; wherein n is an integer less than or equal to 20; wherein X is a moiety comprising a non-ionic, polar functional group other than an acyclic secondary amide group; and wherein HT is a hydrophobic moiety.

In another aspect, a mixture according to an embodiment of the invention comprises a plurality of charged particles, a first charge control agent, and a second charge control agent, wherein the second charge control agent comprises an ammonium cation, an acyclic secondary amide group, and a hydrophobic moiety.

In another aspect, a mixture according to an embodiment of the invention is present in a dispersion in a fluid, wherein the plurality of charged particles are capable of moving through the fluid upon application of an electric field. An electro-optic display having an electrophoretic medium may comprise said dispersion.

These and other aspects of the present invention will be apparent in view of the following description.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

The present invention provides mixtures comprising pigment particles and improved charge control agents. A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the mixtures of the present invention.

The mixtures may be incorporated into dispersions that are useful in electrophoretic media and incorporated into displays, or into front plane laminates or inverted front plane laminates that are coupled to a backplane to form a display. Alternatively, the mixtures may be useful in other applications, such as compositions for use as electrophotographic toners in printing applications.

Electrophotography or xerography, as used herein, is a method printing an image on a substrate. A latent image comprising electrostatic charge is formed on a coated plate or roller, followed by (a) the attachment of oppositely charged particles on the charged portion of the plate or roller (b) transferring the charged particles on the substrate and (c) fusing the particles on the substrate by heating. Typical charged particles comprise a color pigment, a resin, and one or more charge control agents. The particles are used in the form of a powder called "toner" or "electrophotographic toner", wherein the powder comprises particles having a specific average particle size.

As used herein, "head group" of a molecule that comprises both a hydrophilic and hydrophobic part is the functional group of the hydrophilic part of the molecule. The molecule may have one or more than one head groups.

The term "molecular weight" or "MW" as used herein refers to the weight average molecular weight, unless otherwise stated. The weight average molecular weight is measured by gel permeation chromatography.

"Ancillary functionality" or "ancillary functional group", as used throughout the specification and the claims, means a non-ionic, polar functional group of a charge control agent. "Ancillary functional groups" may include an ester group, a hydroxyester group, a tertiary amide group, a carbamate group, a noncyclic urea group, a cyclic urea, a cyclic amide, a cyclic amide, and other non-ionic polar functional groups.

The mixtures according to the various embodiments of the present invention may comprise a plurality of charged particles and a first charge control agent comprising a cationic head group and having a chemical structure according to Formulas I,

Formula I wherein m is 0, 1, 2, or 3; wherein each R is independently selected from the group consisting of an alkyl group, and an aryl group; wherein Z is one of a branched alkanediyl group, and an unbranched alkanediyl group; wherein n is an integer less than or equal to 20; wherein X is a moiety comprising a non-ionic, polar functional group other than an acyclic secondary amide group; and wherein HT is a hydrophobic moiety. The groups R may be methyl, ethyl, propyl, phenyl or benzyl groups. If there are more than one alkyl groups connected to the amine atom of the quaternary ammonium group of Formula I, the alkyl groups may be the same or different. For example, Formula I may comprise a trimethylammonium cationic group, a triethylammonium cationic group, a dimethylethylammonium cation group, etc. Group $(Z)_n$ may be —CH$_2$—, —CH$_2$CH$_2$—, —CH$_2$CH$_2$CH$_2$—, —CH$_2$CH$_2$CH$_2$CH$_2$—, etc. Group $(Z)_n$ may be an unbranched group —(CH$_2$)$_q$— wherein q may be from 1 to 20. Alternatively, group $(Z)_n$ may be a branched alkanediyl group, such as —CH$_2$(CH$_3$)CH$_2$CH$_2$—. The X moiety may comprise a variety of non-ionic, polar functional groups such as an ester group [—O—C(O)—], a hydroxyester group, a thioester [—S—C(O)—], a tertiary amide group [—N(alkyl)-C(O)—O—], a carbamate group [—NH—C(O)—O-] or [—O—C(O)—NH—], a noncyclic urea group [—NH—C(O)—NH—], a cyclic urea, a cyclic amide, a cyclic amide, and combinations thereof.

Alternatively, the mixtures according to the various embodiments of the present invention may comprise a plurality of charged particles and a first charge control agent comprising a cationic head group and having a chemical structure according to Formula II, Formula II wherein R is an alkyl group or an aryl group; $R_1$, $R_2$ are independently selected from the group consisting of an alkyl group, an aryl group, and group —[$(Z)_n$—X-HT]; wherein Formula II comprises at least one —[$(Z)_n$—X-HT]; wherein group $(Z)_n$ is one of a branched alkanediyl group, and an unbranched alkanediyl group; wherein n is an integer less than or equal to 20; wherein X is a moiety comprising a non-ionic, polar functional group other than an acyclic secondary amide group; and wherein HT is a hydrophobic moiety. In one example of a compound represented by Formula II, both R and $R_2$ are methyl. Group —$(Z)_n$— may be unbranched or branched methylidene group. In one example, the group —$(Z)_n$— is —$CH_2CH_2$—. In another example, the group —$(Z)_n$— is —$CH_2CH_2CH_2$—. The X moiety may comprise a variety of non-ionic, polar functional groups such as an ester group, a hydroxyester group, a thioester, a tertiary amide group, a carbamate group, a noncyclic urea group, a cyclic urea, a cyclic amide, a cyclic amide, and combinations thereof.

Alternatively, the mixtures according to the various embodiments of the present invention may comprise a plurality of charged particles and a first charge control agent comprising two cationic head groups and having a chemical structure according to Formula III, Formula III wherein R is an alkyl group or an aryl group; wherein $R_3$, $R_4$, and $R_5$ are independently selected from the group consisting of an alkyl group, an aryl group, and group —[$(Z)_n$—X-HT]; wherein Formula III comprises at least one —[$(Z)_n$—X-HT] group; wherein Z is one of a branched alkanediyl group, and an unbranched alkanediyl group; wherein n is an integer less than or equal to 20; wherein X is a moiety comprising a non-ionic, polar functional group other than an acyclic secondary amide group; and wherein HT is a hydrophobic moiety. In one example of a compound represented by Formula III, both R and $R_3$ are methyl. Group —$(Z)_n$— may be unbranched or branched methylidene group. In one example, the group —$(Z)_n$— is —$CH_2CH_2$—. In another example, the group —$(Z)_n$— is —$CH_2CH_2CH_2$—. The X moiety may comprise a variety of non-ionic, polar functional groups such as an ester group, a hydroxyester group, a thioester, a tertiary amide group, a carbamate group, a noncyclic urea group, a cyclic urea, a cyclic amide, a cyclic amide, and combinations thereof.

Alternatively, the mixtures according to the various embodiments of the present invention may comprise a plurality of charged particles and a first charge control agent comprising a cationic head group and having a chemical structure according to Formula IV, Formula IV wherein R is an alkyl group or an aryl group; wherein $R_6$, $R_7$, and $R_8$ are independently selected from the group consisting of an alkyl group, an aryl group, and group —[$(Z)_n$—X-HT]; wherein Formula IV comprises at least one —[$(Z)_n$—X-HT] group; wherein Z is one of a branched alkanediyl group, and an unbranched alkanediyl group; wherein n is an integer less than or equal to 20; wherein X is a moiety comprising a non-ionic, polar functional group other than an acyclic secondary amide group; and wherein HT is a hydrophobic moiety. In one example of a compound represented by Formula IV, both R and $R_6$ are methyl. Group —$(Z)_n$— may be unbranched or branched methylidene group. In one example, the group —$(Z)_Q$— is —$CH_2CH_2$—. In another example, the group —$(Z)$— is —$CH_2CH_2CH_2$—. The X moiety may comprise a variety of non-ionic, polar functional groups such as an ester group, a hydroxyester group, a thioester, a tertiary amide group, a carbamate group, a noncyclic urea group, a cyclic urea, a cyclic amide, a cyclic amide, and combinations thereof.

Alternatively, the mixtures according to the various embodiments of the present invention may comprise a plurality of charged particles and a first charge control agent comprising a cationic head group and having a chemical structure according to Formula V, Formula V wherein $R_9$, and $R_{10}$, are independently selected from the group consisting of an alkyl group, an aryl group, and group —[$(Z)_n$—X-HT]; wherein Formula V comprises at least one —[$(Z)_n$—X-HT] group; wherein Z is one of a branched alkanediyl group, and an unbranched alkanediyl group; wherein n is an integer less than or equal to 20; wherein X is a moiety comprising a non-ionic, polar functional group other than an acyclic secondary amide group; and wherein HT is a hydrophobic moiety. In one example of a compound represented by Formula V, group $R_{10}$ is methyl. In another example, group $R_{10}$ is ethyl. Group —$(Z)_n$— may be unbranched or branched methylidene group. In one example, the group —$(Z)_n$— is —$CH_2CH_2$—. In another example, the group —$(Z)_n$— is —$CH_2CH_2CH_2$—. The X moiety may comprise a variety of non-ionic, polar functional groups such as an ester group, a hydroxyester group, a thioester, a tertiary amide group, a carbamate group, a noncyclic urea group, a cyclic urea, a cyclic amide, a cyclic amide, and combinations thereof.

Certain charge control agents (CCAs) that are currently used in electrophoretic displays and other fields comprise quaternary ammonium head groups, a secondary amide —NH—C(O)—, and one or more polymeric tails. Typically, the performance of electrophoretic displays is optimized by: (1) adjusting the relative mass of the charge control agents in the electrophoretic dispersions; and/or (2) adjusting the nitrogen content of the electrophoretic dispersions by blending ionic polymeric CCAs and fatty quaternary ammonium salts. The type of ancillary functionality present in the chemical structure of the charge control agent was heretofore not considered relevant.

Surprisingly, the inventors of the present invention have discovered that pigment charges are impacted and can be controlled by the selection of the type of ancillary functionality present in the chemical structure of a charge control agent also comprising a cationic head group. More specifically, incorporating ancillary functionality other than an acyclic secondary amide group in quaternary charge control agents substantially modifies and improves the performance of electrophoretic displays.

The charge control agents used in the various embodiments of the present invention are not limited to mono-quaternary ammonium materials. The materials may include, for example, bis-quaternary ammonium salts, tris-quaternary ammonium salts, etc. As previously noted, the charge control agents incorporated in the dispersion made according to the various embodiments of the present invention include ancillary functionality in addition to or instead of an acyclic secondary amide group. Ancillary functionality may be acyclic or cyclic of varying ring sizes. The chemical structure of the charge control agents may also comprise a plurality of types of ancillary functionality or only one type. For example, a bis-quaternary charge control agent (i.e., two quaternary amine head groups per molecule) could contain one urea group as ancillary functionality associated with one head group and one ester as ancillary functionality associated with the other head group. Alternatively, an ester group (or a urea group) may serve as both ancillary functionalities. In yet another alternative, the moiety X in Formulas I-V above may comprise a plurality of ancillary functionalities; however, it is preferred that one of the ancillary functionalities, which is closest to the head group (i.e. closer in proximity within the chemical structure), is an ancillary functionality other than an acyclic secondary amide group.

Examples of chemical structures of charge control agents comprising a cationic head group and ancillary functionality other than an acyclic secondary amide group include, but are not limited to, the following structures:

(a)

Ester-Quat (b)

Hydroxy Ester-Quat (c)

3° Amide-Quat

(d)

2° Carbamate-Quat       2° Carbamate-Quat

-continued (e)

2° Urea-Quat (f)

Cyclic Urea-Quat (g)

Cyclic 3° Amide-Quat (h)

Cyclic 2° Amide-Quat

More specific examples include, but are not limited to the following structures represented by Formulas VII to XIII;

(i)

Formula VII

(j)

Formula VIII (k)

Formula IX

-continued

Synthetic procedures for making the charge control agents incorporated in the various embodiments of the present invention may be devised in any number of ways to provide the desired functionality distribution. For example, two or more monomers comprising a cationic head group and ancillary functionality may be co-polymerized with one or more monomers or oligomers for forming a hydrophobic oligomeric or polymeric tail. Alternatively, the charge control agents may be prepared by post-modification techniques wherein the initial charge control activity is changed as a result of incorporation or modification of the ancillary functionality. Mixtures according to various embodiments of the present invention may include a blend of different charge control agents. For example, some blends may include two or more charge control agents, wherein at least one of the charge control agents has one or more cationic head groups associated with an ancillary functionality other than an acyclic secondary amide group.

The chemical structure of the charge control agents may also include multiple hydrophobic moieties, including oligomeric or polymeric tails. The oligomeric or polymeric tails may be derived from one or more different monomers and/or oligomers for varying molecular weight and hydrophobicity and can be linear or have varying degrees of branching. The hydrophobic moiety HT in Formulas I-V may be an oligomeric or polymeric tail. If the charge control agents are included in an electrophoretic medium comprising a dispersion, the hydrophobic moiety is preferably compatible with the dispersion fluid. In some embodiments the hydrophobic oligomeric or polymeric tail may be unsaturated, i.e., have at least one carbon-carbon double bond. The oligomeric or polymeric hydrophobic tail may be derived from one or more monomers including, but not limited to, ricinoleic acid and isobutylene.

The hydrophobic moiety HT of the CCA of the present invention may be formed from a reaction between a reagent A-B having a functional group A, wherein the functional group A is able to react with functional group Y of another molecule $G\text{-}(Z)_n\text{—}Y$, which for convenience is herein referred to as CCA precursor. The reaction scheme is illustrated in Equation 1:

$$G\text{-}(Z)_n\text{-}Y + A\text{-}B \rightarrow G\text{-}(Z)_n\text{-}HT \qquad \text{Equation 1.}$$

Group $(Z)_n$ corresponds to the linking group of the resulting CCA, which connects the quaternary ammonium group of the CCA with the non-ionic, polar functional group X. For convenience and simplicity, G represents the part of the CCA precursor that is connected to the linking group. G may contain one or more additional functional groups Y (or other reactive functional groups) that can react with reagent A-B.

The reaction between functional groups A and Y may be a condensation reaction. It may also be an addition reaction. For example, functional group A may be a carboxylic acid, a carboxylic anhydride, an acyl halide, or an epoxy. These functional groups are able to react with functional group Y of the CCA precursor, wherein Y may be a hydroxy, an amine, or a thiol. Of course, in order for the CCA to comprise a hydrophobic moiety HT, reagent A-B must also contain a hydrophobic group. Reagent A-B may also be a monomer, which is polymerized to provide a hydrophobic polymer. For example, reagent A-B may be a hydroxy fatty acid, such as ricinoleic acid, which polymerizes to poly (ricinoleic acid). Alternatively, functional group A may be a hydroxy, an amine, or a thiol and functional group Y may be a carboxylic acid, a carboxylic anhydride, an acyl halide, or an epoxy.

In one embodiment the HT hydrophobic moiety may be formed from the reaction of Y functional group of CCA precursor and two or more monomers. In one example, the Y functional group is a hydroxy group. The two monomers may be a monohydroxy, monocarboxylic acid and a dihydroxy, monocarboxylic acid. The polymerization of the two monomers and the reaction with the hydroxy group of the CCA precursor will lead to CCA having a polyester hydrophobic group with one or more branches. A specific example of such CCA can be formed from the condensation reaction between (a) 3-(dimethylamino)-1-propanol, (b) recinoleic acid, and (c) 2,2-dimethylol propionic acid $[CH_3C(CH_2OH)_2COOH]$.

Reagent A-B may contain two or more groups A. Also, mixtures of two or more monomeric reagents may be used in the same preparation. This may enable the preparation of different CCAs of various polymeric architectures in their hydrophobic HT moiety.

Non-limiting examples of fatty acid classes that can serve as reagents (A-B) are linear saturated fatty acids, branched saturated fatty acids, and unsaturated fatty acids. The linear saturated fatty acids may contain an alkyl chain of from about 10 to about 35 carbon atoms. Non-limiting examples of branched saturated fatty acids include fatty acids that comprise an iso alkyl group that contain from about 10 carbon atoms to about 35 carbon atoms, fatty acids that comprise an anteiso alkyl group that contain from about 10 carbon atoms to about 35 carbon atoms, 3,7,11,15-tetramethylhexadecanoic acid, 2,6,10,14-tetramethylpentadecanoic acid, 4,8,12-trimethyltridecanoic acid, 13,13-dimethyltetradecanoic acid, and 10-methyloctadecanoic acid. Iso fatty acid is a fatty acid that has an alkyl branch in the ω-2 position. Anteiso fatty acid is a fatty acid that has an alkyl branch in the ω-2 position. The unsaturated fatty acids may contain a hydrocarbon chain having form about 10 carbon atoms to about 35 carbon atoms and one or more carbon-carbon double bonds. Non-limiting examples of unsaturated fatty acids include oleic acid, palmitoleic acid, myristoleic acid, linoleic acid, arachidonic acid, alpha-linolenic acid, sapienic acid, elaidic acid, vaccenic acid, linoelaidic acid, eicosapentaenoic acid, erucic acid, 7-methyl-7-hexadecanoic acid, and docosahexanoic acid.

Non-limiting examples of hydroxy fatty acid classes that can serve as monomeric reagents (A-B) that can polymerized to provide a hydrophobic polymer are saturated fatty acids having a hydrocarbon chain comprising from about 6 carbon atoms to about 35 carbon atoms and one or more hydroxy groups and unsaturated fatty acids having a hydrocarbon chain comprising from about 6 carbon atoms to about 35 carbon atoms, one or more carbon-carbon bonds, and one or more hydroxy groups. Non-limiting examples of such hydroxy fatty acid are ricinoleic acid, w-hydroxy-6-dodecenoic acid, 9,10,13-trihydroxy-11-octadecanoic acid, 9,12,13-trihydroxy-1-octadecenoic acid, 9-hydroxy-10,12-octadecadienoic acid, 13-hydroxy-9,11-octadecadienoic acid, 8-hydroxystearic acid, 2-hydroxy-15-methylhexanoic acid, 3-hydroxy-15-methylhexanoic acid, ω-hydroxy-6-dodecenoic acid, 2-hydroxy-13-methyltetradecanoic acid, and 2-hydroxy-13-methyltetradecanoic acid.

In one embodiment, the —X-HT group can be an imide group comprising a hydrophobic group $R_{11}$, as shown in the Formula XIV. This can be formed by the corresponding Formula XIV succinic anhydride reagent A-B (having hydrophobic substituent $R_{11}$) after its reaction with the CCA precursor G-$(Z)_n$—Y, wherein reactive functional group Y is an amine. The hydrophobic precursor G-$(Z)_n$—Y, wherein reactive functional group Y is an amine. The hydrophobic substituent $R_{11}$ may be an alkyl group comprising from about 10 to about 35 carbon atoms. The alkyl group may also comprise one or more alkyl chain and/or one or more carbon-carbon double bonds. Alternatively, the hydrophobic substituent may be an oligoester or a polyester group formed by the polymerization of hydroxy carboxylic acid, such as ricinoleic acid.

The mixture of the present invention comprising a plurality of charged particles and a first charge control agent, wherein the charge control agent is represented by Formulas I-V may also comprise a second charge control agent. The second charge control agent may comprise one or more anionic head group and a hydrophobic moiety. Non-limiting examples of anionic head groups are carboxylic acid anions, sulfonate anions, sulfate anions, phosphate anions, and phosphonate anions. The second charge control agent may comprise a nonionic head group and a hydrophobic moiety. Non-limiting examples of nonionic head groups are polyethylene oxide, polyethylene glycol, polypropylene oxide, polypropylene glycol, and glucosides. The second charge control agent may comprise a cationic head group and a hydrophobic moiety. Non-limiting examples of cationic head groups are ammonium salts, such as quaternary ammonium salts. The second charge control agent may comprise an amide group, in addition to an anionic, a nonionic, or a cationic head group. The second charge control agent may comprise a cationic head group, such as a quaternary ammonium salt, an acyclic secondary amide functional group, and a hydrophobic moiety. Examples of second charge control agents that comprise (a) a quaternary ammonium salt, (b) an acyclic secondary amide functional group and (c) a hydrophobic moiety include materials that are represented by the following Formula XV,

Formula XV wherein each $R_{21}$, $R_{22}$, $R_{23}$ is independently selected from the group consisting of an alkyl group and an aryl group, wherein v is an integer less than or equal to 20, and wherein HT is a hydrophobic moiety. The hydrophobic moiety HT may comprise a polyester. The hydrophobic moiety HT may comprise a functional group selected from the group consisting of poly(hydroxystearic acid), poly(ricinoleic acid), poly(isobutylene), and an unbranched or a branched alkyl group, wherein the unbranched or the branched alkyl group comprises from about 10 to about 35 carbon atoms. In one example, $R_{21}$, $R_{22}$, $R_{23}$ are methyl groups, v is 3 and HT is poly(ricinoleic acid). In another example, $R_{21}$, $R_{22}$, $R_{23}$ are methyl groups, v is 2 and HT is poly(ricinoleic acid).

The mixture of the present invention comprising a plurality of charged particles and a first charge control agent, wherein the charge control agent is represented by Formulas I-V may also comprise a second charge control agent. The second charge control agent may be represented by the following Formulas XVI and XVII, and wherein HT is a hydrophobic moiety. The hydrophobic moiety HT may comprise a functional group selected from the group consisting of poly(hydroxystearic acid), poly(ricinoleic acid), poly(isobutylene), and an unbranched or a branched alkyl group, wherein the unbranched or the branched alkyl group comprises from about 10 to about 35 carbon atoms;

Formula XVI

Formula XVII

The charge control agents may be added to a dispersion of charged pigment particles, such as an electrophoretic medium, at a concentration of greater than 1 g of charge control agent for every 100 g of charged particles. The charge control agents may have a weight average molecular weight (Mw) greater than 1,000 grams/mole, e.g. greater than 2,000 grams/mole, e.g., greater than 3,000 grams/mole, e.g., greater than 4,000 grams/mole, e.g., greater than 5,000 grams/mole, e.g., greater than 6,000 grams/mole, e.g., greater than 7,000 grams/mole, e.g., greater than 8,000 grams/mole, e.g., greater than 9,000 grams/mole, e.g., greater than 10,000 grams/mole.

In many embodiments, the charge control agents included in the mixtures according to the various embodiments of the present invention adsorb onto the surface of the particles in the mixture and vary the charge thereon. However, the invention is not limited to adsorbed CCAs, and any mixture including charged particles and a CCA that gives the desired performance is suitable. For example, the CCAs may be complexed with the charged particles, absorbed into the particles, or they may be covalently bound to the surface of the particles. The particles and the CCAs may exist in a charge complex, or be loosely associated via van der Waals forces.

As described previously, cationic charge control agents having ancillary functionality other than an acyclic secondary amide group may be blended with another type of cationic charge control agent having an acyclic secondary amide in the various mixtures made according to the embodiments of the present invention. The other type of cationic charge control agents may be purchased in a purified form, or the charge control agents may be purchased as a reaction product that has formed a quaternary amine charge control agent. For example, SOLSPERSE 17000 (Lubrizol Corporation), may be purchased as a reaction product of 12-hydroxy-octadecanoic acid homopolymer with N,N-dimethyl-1,3-propanediamine and methyl bisulfate.

With respect to electrophoretic media, additional charge control agents may be used to provide good electrophoretic mobility to the electrophoretic particles included in the mixtures according to various embodiments of the present invention. Stabilizers may be used to prevent agglomeration of the electrophoretic particles, as well as prevent the electrophoretic particles from irreversibly depositing onto the capsule wall, if the media is encapsulated within capsules. Either component can be constructed from materials across a wide range of molecular weights (low molecular weight, oligomeric, or polymeric), and may be a single pure compound or a mixture. An optional charge control agent or charge director may be used. These constituents typically consist of low molecular weight surfactants, polymeric agents, or blends of one or more components and serve to stabilize or otherwise modify the sign and/or magnitude of the charge on the electrophoretic particles. Additional pigment properties which may be relevant are the particle size distribution, the chemical composition, and the lightfastness.

Charge adjuvants may also be added in the mixtures according to the various embodiments of the present invention. These materials increase the effectiveness of the charge control agents or charge directors. The charge adjuvant may be a polyhydroxy compound or an amino alcohol compound, and is preferably soluble in the suspending fluid in an amount of at least 2% by weight. Examples of polyhydroxy compounds which contain at least two hydroxyl groups include, but are not limited to, ethylene glycol, 2,4,7,9-tetramethyldecyne-4,7-diol, poly(propylene glycol), pentaethylene glycol, tripropylene glycol, triethylene glycol, glycerol, pentaerythritol, glycerol tris(12-hydroxystearate), propylene glycerol monohydroxystearate, and ethylene glycol monohydroxystearate. Examples of amino alcohol compounds which contain at least one alcohol function and one amine function in the same molecule include, but are not limited to, triisopropanolamine, triethanolamine, ethanolamine, 3-amino-1-propanol, o-aminophenol, 5-amino-1-pentanol, and tetrakis(2-hydroxyethyl)ethylenediamine. The charge adjuvant is preferably present in the suspending fluid in an amount of about 1 to about 100 milligrams per gram ("mg/g") of the particle mass, and more preferably about 50 to about 200 mg/g.

The mixtures containing the charged particle CCA complexes according the various embodiments of the present invention may be used with advantage in all of the types of electrophoretic display (namely single particle, opposite charge dual particle, same polarity dual particle and polymer dispersed) previously described. The described charged particle CCA complexes may be used to construct an electrophoretic medium having only one type of particle, such as used in a variable transmission window. The described charged particle CCA complexes may be used to construct an electrophoretic medium to be used in black/white displays, i.e., including black particles and white particles. The described charged particle CCA complexes may be used to construct an electrophoretic medium to be used in colors displays, i.e., including, for example, three, four, five, six, seven, or eight different types of particles. For examples, a display may be constructed where the particles include black, white, and red or black, white, and yellow. Alternatively, the display may include red, green, and blue particles, or cyan, magenta, and yellow particles, or red, green, blue, and yellow particles.

For electrophoretic display applications, the mixtures of particles and charge control agents according to the various embodiments of the present invention may be dispersed in a suspending fluid and encapsulated to provide an encapsulated electrophoretic medium that may be incorporated into a display. The electrophoretic media made according to the various embodiments of the present invention may employ the same components and manufacturing techniques as in the aforementioned Massachusetts Institute of Technology and E Ink Corporation patents and applications.

For example, the suspending fluid containing the particles should be chosen based on properties such as density, refractive index, and solubility. A preferred suspending fluid has a low dielectric constant (about 2), high volume resistivity (about 1015 ohm-cm), low viscosity (less than 5 centistokes ("cst")), low toxicity and environmental impact, low water solubility (less than 10 parts per million ("ppm")), a high boiling point (greater than 90° C.), and a low refractive index (less than 1.2).

The choice of non-polar fluid may be based on concerns of chemical inertness, density matching to the electrophoretic particle, or chemical compatibility with both the electrophoretic particle and bounding capsule (in the case of encapsulated electrophoretic displays). The viscosity of the fluid should be low when movement of the particles is desired. The refractive index of the suspending fluid may also be substantially matched to that of the particles. As used herein, the refractive index of a suspending fluid "is substantially matched" to that of a particle if the difference between their respective refractive indices is between about zero and about 0.3, and is preferably between about 0.05 and about 0.2.

Non-polar organic solvents, such as halogenated organic solvents, saturated linear or branched hydrocarbons, silicone oils, and low molecular weight halogen-containing polymers are some useful non-polar fluids. The non-polar fluid may comprise a single fluid. The non-polar fluid will, however, often be a blend of more than one fluid in order to tune its chemical and physical properties. Furthermore, the non-polar fluid may contain additional surface modifiers to modify the surface energy or charge of the electrophoretic particle or bounding capsule. Reactants or solvents for the microencapsulation process (oil soluble monomers, for example) can also be contained in the suspending fluid. Additional charge control agents can also be added to the suspending fluid.

Useful organic solvents include, but are not limited to, epoxides, such as decane epoxide and dodecane epoxide; vinyl ethers, such as cyclohexyl vinyl ether and Decave (Registered Trade Mark of International Flavors & Fragrances, Inc., New York, N.Y.); and aromatic hydrocarbons, such as toluene and naphthalene. Useful halogenated organic solvents include, but are not limited to, tetrafluorodibromoethylene, tetrachloroethylene, trifluorochloroethylene, 1,2,4-trichlorobenzene and carbon tetrachloride. These materials have high densities. Useful hydrocarbons include, but are not limited to, dodecane, tetradecane, the aliphatic hydrocarbons in the Isopar (Registered Trade Mark) series (Exxon, Houston, Tex.), Norpar (Registered Trade Mark) (a series of normal paraffinic liquids), Shell-Sol (Registered Trade Mark) (Shell, Houston, Tex.), and Sol-Trol (Registered Trade Mark) (Shell), naphtha, and other petroleum solvents. These materials usually have low densities. Useful examples of silicone oils include, but are not limited to, octamethyl cyclosiloxane and higher molecular weight cyclic siloxanes, poly(methyl phenyl siloxane), hexamethyldisiloxane, and polydimethylsiloxane. These materials usually have low densities. Useful low molecular weight halogen-containing polymers include, but are not limited to, poly(chlorotrifluoroethylene) polymer (Halogenated Hydrocarbon Inc., River Edge, N.J.), Galden (Registered Trade Mark) (a perfluorinated ether from Ausimont, Morristown, N.J.), or Krytox (Registered Trade Mark) from du Pont (Wilmington, Del.). In a preferred embodiment, the suspending fluid is a poly (chlorotrifluoroethylene) polymer. In a particularly preferred embodiment, this polymer has a degree of polymerization from about 2 to about 10. Many of the above materials are available in a range of viscosities, densities, and boiling points.

The non-polar fluid must be capable of being formed into small droplets prior to a capsule being formed. Processes for forming small droplets include flow-through jets, membranes, nozzles, or orifices, as well as shear-based emulsifying schemes. The formation of small drops may be assisted by electrical or sonic fields. Surfactants and polymers can be used to aid in the stabilization and emulsification of the droplets in the case of an emulsion type encapsulation. One surfactant for use in displays of the invention is sodium dodecylsulfate.

It some embodiments, the non-polar fluid will include an optically absorbing dye. This dye must be soluble in the fluid, but will generally be insoluble in the other components of the capsule. There is much flexibility in the choice of dye material. The dye can be a pure compound, or blends of dyes to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable by, for example, thermal, photochemical or chemical diffusion processes, forming a solid absorbing polymer inside the bounding shell.

There are many dyes that can be used in encapsulated electrophoretic displays. Properties important here include light fastness, solubility in the suspending liquid, color, and cost. These dyes are generally chosen from the classes of azo, anthraquinone, and triphenylmethane type dyes and may be chemically modified so as to increase their solubility in the oil phase and reduce their adsorption by the particle surface.

A number of dyes already known to those skilled in the art of electrophoretic displays will prove useful. Useful azo dyes include, but are not limited to: the Oil Red dyes, and the Sudan Red and Sudan Black series of dyes. Useful anthraquinone dyes include, but are not limited to: the Oil Blue dyes, and the Macrolex Blue series of dyes. Useful triphenylmethane dyes include, but are not limited to, Michler's hydrol, Malachite Green, Crystal Violet, and Auramine O.

In general, it is believed that charging results as an acid-base reaction between some moiety present in the continuous phase and the particle surface. Thus useful materials are those which are capable of participating in such a reaction, or any other charging reaction as known in the art.

Particle dispersion stabilizers may be added to prevent particle flocculation or attachment to the capsule walls. For the typical high resistivity liquids used as suspending fluids in electrophoretic displays, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

If a bistable electrophoretic medium is desired, it may be desirable to include in the suspending fluid a polymer having a number average molecular weight in excess of about 20,000, this polymer being essentially non-absorbing on the electrophoretic particles; poly(isobutylene) is a preferred polymer for this purpose. See application Ser. No. 10/063, 236 filed Apr. 2, 2002 (Publication No. 2002/0180687; the entire disclosure of this copending application is herein incorporated by reference), and the corresponding International Application No. PCT/US02/10267 (Publication No. WO 02/079869).

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

The term gray scale is used herein in its conventional meaning in the imaging art to refer to a state intermediate two extreme optical states of a pixel, and does not necessarily imply a black-white transition between these two extreme states. For example, several of the aforementioned E Ink patents and published applications describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states.

The dispersions comprising the suspending fluid, particles, and charge control agent(s) may then be encapsulated. An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Encapsulation of the electrophoretic medium may be accomplished in a number of different ways. Numerous suitable procedures for microencapsulation are detailed in both Microencapsulation, Processes and Applications, (I. E. Vandegaer, ed.), Plenum Press, New York, N.Y. (1974) and Gutcho, Microcapsules and Microencapsulation Techniques, Noyes Data Corp., Park Ridge, N.J. (1976). The processes fall into several general categories, all of which can be applied to the present invention: interfacial polymerization, in situ polymerization, physical processes, such as coextrusion and other phase separation processes, in-liquid curing, and simple/complex coacervation.

Numerous materials and processes should prove useful in formulating displays of the present invention. Useful materials for simple coacervation processes to form the capsule include, but are not limited to, gelatin, poly(vinyl alcohol), poly(vinyl acetate), and cellulosic derivatives, such as, for example, carboxymethylcellulose. Useful materials for complex coacervation processes include, but are not limited to, gelatin, acacia, carageenan, carboxymethylcellulose, hydrolyzed styrene anhydride copolymers, agar, alginate, casein, albumin, methyl vinyl ether co-maleic anhydride, and cellulose phthalate. Useful materials for phase separation processes include, but are not limited to, polystyrene, poly(methyl methacrylate) (PMMA), poly(ethyl methacrylate), poly(butyl methacrylate), ethyl cellulose, poly(vinylpyridine), and polyacrylonitrile. Useful materials for in situ polymerization processes include, but are not limited to, polyhydroxyamides, with aldehydes, melamine, or urea and formaldehyde; water-soluble oligomers of the condensate of melamine, or urea and formaldehyde; and vinyl monomers, such as, for example, styrene, methyl methacrylate (MMA) and acrylonitrile. Finally, useful materials for interfacial polymerization processes include, but are not limited to, diacyl chlorides, such as, for example, sebacoyl, adipoyl, and di- or poly-amines or alcohols, and isocyanates. Useful emulsion polymerization materials may include, but are not limited to, styrene, vinyl acetate, acrylic acid, butyl acrylate, t-butyl acrylate, methyl methacrylate, and butyl methacrylate.

Capsules produced may be dispersed into a curable carrier, resulting in an ink which may be printed or coated on large and arbitrarily shaped or curved surfaces using conventional printing and coating techniques.

In the context of the present invention, one skilled in the art will select an encapsulation procedure and wall material based on the desired capsule properties. These properties include the distribution of capsule radii; electrical, mechanical, diffusion, and optical properties of the capsule wall; and chemical compatibility with the internal phase of the capsule.

The capsule wall generally has a high electrical resistivity. Although it is possible to use walls with relatively low resistivities, this may limit performance in requiring relatively higher addressing voltages. The capsule wall should also be mechanically strong (although if the finished capsule powder is to be dispersed in a curable polymeric binder for coating, mechanical strength is not as critical). The capsule wall should generally not be porous. If, however, it is desired to use an encapsulation procedure that produces porous capsules, these can be overcoated in a post-processing step (i.e., a second encapsulation). Moreover, if the capsules are to be dispersed in a curable binder, the binder will serve to close the pores. The capsule walls should be optically clear. The wall material may, however, be chosen to match the refractive index of the internal phase of the capsule (i.e., the suspending fluid) or a binder in which the capsules are to be dispersed. For some applications (e.g., interposition between two fixed electrodes), monodispersed capsule radii are desirable.

An encapsulation technique that is suited to the present invention involves a polymerization between urea and formaldehyde in an aqueous phase of an oil/water emulsion in the presence of a negatively charged, carboxyl-substituted, linear hydrocarbon polyelectrolyte material. The resulting capsule wall is a urea/formaldehyde copolymer, which discretely encloses the internal phase. The capsule is clear, mechanically strong, and has good resistivity properties.

The related technique of in situ polymerization utilizes an oil/water emulsion, which is formed by dispersing the electrophoretic fluid (i.e., the dielectric liquid containing a suspension of the pigment particles) in an aqueous environment. The monomers polymerize to form a polymer with higher affinity for the internal phase than for the aqueous phase, thus condensing around the emulsified oily droplets. In one in situ polymerization process, urea and formaldehyde condense in the presence of poly(acrylic acid) (see, e.g., U.S. Pat. No. 4,001,140). In other processes, described in U.S. Pat. No. 4,273,672, any of a variety of cross-linking agents borne in aqueous solution is deposited around microscopic oil droplets. Such cross-linking agents include aldehydes, especially formaldehyde, glyoxal, or glutaraldehyde; alum; zirconium salts; and polyisocyanates.

The coacervation approach also utilizes an oil/water emulsion. One or more colloids are coacervated (i.e., agglomerated) out of the aqueous phase and deposited as shells around the oily droplets through control of temperature, pH and/or relative concentrations, thereby creating the microcapsule. Materials suitable for coacervation include gelatins and gum arabic. See, e.g., U.S. Pat. No. 2,800,457.

The interfacial polymerization approach relies on the presence of an oil-soluble monomer in the electrophoretic composition, which once again is present as an emulsion in an aqueous phase. The monomers in the minute hydrophobic droplets react with a monomer introduced into the aqueous phase, polymerizing at the interface between the droplets and the surrounding aqueous medium and forming shells around the droplets. Although the resulting walls are relatively thin and may be permeable, this process does not require the elevated temperatures characteristic of some other processes, and therefore affords greater flexibility in terms of choosing the dielectric liquid.

Additional materials may be added to encapsulated medium to improve the construction of an electrophoretic display. For example, coating aids can be used to improve the uniformity and quality of the coated or printed electrophoretic ink material. Wetting agents may be added to adjust the interfacial tension at the coating/substrate interface and to adjust the liquid/air surface tension. Wetting agents include, but are not limited to, anionic and cationic surfactants, and nonionic species, such as silicone or fluoropolymer-based materials. Dispersing agents may be used to modify the interfacial tension between the capsules and binder, providing control over flocculation and particle settling.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc. Once the microcells are filled with the electrophoretic medium, the microcells are sealed, an electrode (or an electrode array) is affixed to the microcells, and the filled microcells are driven with electric fields to create a display.

For example, as described in U.S. Pat. No. 6,930,818, a male mold may be used to imprint a conductive substrate, upon which is formed a transparent conductor film. A layer of a thermoplastic or thermoset precursor is then coated on the conductor film. The thermoplastic or thermoset precursor layer is embossed at a temperature higher than the glass transition temperature of the thermoplastic or thermoset precursor layer by the male mold in the form of a roller, plate or belt. Once formed, the mold is released during or after the precursor layer is hardened to reveal an array of microcells. The hardening of the precursor layer may be accomplished by cooling, cross-linking by radiation, heat or moisture. If the curing of the thermoset precursor is accomplished by UV radiation, UV may radiate onto the transparent conductor film from the bottom or the top of the web as shown in the two figures. Alternatively, UV lamps may be placed inside the mold. In this case, the mold must be transparent to allow the UV light to radiate through the pre-patterned male mold on to the thermoset precursor layer.

The thermoplastic or thermoset precursor for the preparation of the microcells may be multifunctional acrylate or methacrylate, vinylether, epoxide and their oligomers, polymers and the like. A crosslinkable oligomer imparting flexibility, such as urethane acrylate or polyester acrylate, is usually also added to improve the flexure resistance of the embossed microcells. The composition may contain polymer, oligomer, monomer and additives or only oligomer, monomer and additives.

In general, the microcells can be of any shape, and their sizes and shapes may vary. The microcells may be of substantially uniform size and shape in one system. However, in order to maximize the optical effect, microcells having a mixture of different shapes and sizes may be produced. For example, microcells filled with a dispersion of the red color may have a different shape or size from the green microcells or the blue microcells. Furthermore, a pixel may consist of different numbers of microcells of different colors. For example, a pixel may consist of a number of small green microcells, a number of large red microcells, and a number of small blue microcells. It is not necessary to have the same shape and number for the three colors.

The openings of the microcells may be round, square, rectangular, hexagonal, or any other shape. The partition area between the openings is preferably kept small in order to achieve a high color saturation and contrast while maintaining desirable mechanical properties. Consequently the honeycomb-shaped opening is preferred over, for example, the circular opening.

For reflective electrophoretic displays, the dimension of each individual microcell may be in the range of about $10^2$ to about $5 \times 10^5$ $\mu m^2$, preferably from about 103 about $5 \times 10^4$ $\mu m^2$. The depth of the microcells is in the range of about 3 to about 100 microns, preferably from about 10 to about 50 microns. The opening to wall ratio is in the range of from about 0.05 to about 100, preferably from about 0.4 to about 20. The distances of the openings usually are in the range of from about 15 to about 450 microns, preferably from about 25 to about 300 microns from edge to edge of the openings.

As noted above, electrophoretic media require the presence of a fluid. In most prior art electrophoretic media, this fluid is a liquid, but electrophoretic media can be produced using gaseous fluids; see, for example, Kitamura, T., et al., Electrical toner movement for electronic paper-like display, IDW Japan, 2001, Paper HCS1-1, and Yamaguchi, Y., et al., Toner display using insulative particles charged triboelectrically, IDW Japan, 2001, Paper AMD4-4). See also U.S. Pat. Nos. 7,321,459 and 7,236,291.

Because encapsulated electrophoretic media is easily applied to flexible substrates, electrophoretic displays may be assembled using various lamination procedures. The aforementioned U.S. Pat. No. 6,982,178 describes a method of assembling electrophoretic displays (including an encapsulated electrophoretic display). Essentially, this patent describes a so-called front plane laminate (FPL) which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term light-transmissive is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term light-transmissive should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or indium tin oxide (ITO), or may be a conductive polymer. Poly(ethylene terephthalate) (PET) films coated with aluminum or ITO are available commercially, for example as aluminized Mylar (Mylar is a Registered Trade Mark) from E.I. du Pont de Nemours & Company, Wilmington DE, and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called double release sheet which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called inverted front plane laminate, which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

The previously described charge control agents according to the various embodiments of the present invention may also be used to form electrophotographic toner. The charge control agents may be mixed or dispersed within a polymeric binder (e.g. co-extruded) that is then ground to form electrophotographic toner. The polymers useful in forming the binder include, but are not limited to, polycarbonates, resin-modified maleic alkyd polymers, polyamides, phenol-formaldehyde polymers and various derivatives thereof, polyester condensates, modified alkyd polymers, and aromatic polymers containing alternating methylene and aromatic units, polyesters (e.g. polymeric esters of acrylic and methacrylic acid such as poly(alkylacrylate)), and various styrene-containing polymers.

EXAMPLES

Examples are now given, though by way of illustration only, to show details of preferred electrophoretic media of the present invention.

Example 1

Preparation of Charge Control Agents—A mixture of hydrophobic monomers was separately combined with each of the monomers having ancillary functionality. Each monomer providing head group and ancillary functionality identified in Table 1 below was mixed with a monomer comprising hydrophobic moiety. Each mixture was heated to 210° C. under nitrogen and with azeotropic removal of water using toluene. At the completion of the reaction, as determined by acid value titration, the reaction mixture was cooled, dimethyl sulfate (s 1 equivalent of amine) was added and the methylation reaction was allowed to take place under ambient conditions for a period of at least 12 hours. At the completion of the reaction, the excess toluene was removed by vacuum distillation and the product was mixed with the designed solvent (e.g. Isopar E) to the required solids content. The molecular structures of the CCA molecules produced are provided below.

TABLE 1

| CCA | Monomer providing Head Group and Ancillary Functionality | Mw |
| --- | --- | --- |
| 1124-89 | 3-(Dimethylamino)-1-propylamine | 4193 * |
| 106 | 3-(Dimethylamino)-1-propylamine | 6379 * |
| 111 | 3-(Dimethylamino)-1-propylamine | 9038 * |
| 113 | 3-Dimethylamino-1-propanol | 3968 |
| 116 | 1,4-Bis(3-aminopropyl)piperazine | 10219 * |
| 117 | 3-Dimethylamino-1-propanol | 9558 * |
| 118 | 1,4-Bis(3-aminopropyl)piperazine | 10219 * |
| 119 | 1,4-Bis(3-aminopropyl)piperazine | 2282 |
| 120 | Tris(3-aminopropyl)amine | 4034 * |
| 122 | 3-(Dimethylamino)-1-propylamine | ~1100 |

*Mw for tert-amine precursor prior to reaction with dimethyl sulfate. The values of the molecular weights reported in Table 1 represent weight average molecular weights.

Zeta potential measurements of dispersions containing pigment particles (black, cyan, white, and yellow) and each of the CCAs were performed using a Colloidal Dynamics AcoustoSizer II and ZetaProbe on samples dispersed in Isopar E. Based on the results provided in Table 2 below, the type of ancillary functionality present in the charge control agent affected the zeta potential of the pigment particles. For each sample, an acyclic secondary amide functional group provided a more positive zeta charge than an ester functional group, which provided a more positive zeta charge than the imide group as ancillary functionality.

TABLE 2

| | | | | |
|---|---|---|---|---|
| Black Pigment BK640 | CCA Functionality Zeta Charge (mV) | 1124-89 amide-quat 168 | 113 ester-quat 93 | 119 imide-quat 62 |
| Cyan Pigment CP207 | CCA Functionality Zeta Charge (mV) | 111 amide-quat 87 | 117 ester-quat 58 | 119 imide-quat −21 |
| White Pigment WH603 | CCA Functionality Zeta Charge (mV) | 111 amide-quat 29 | 117 ester-quat 9 | 119 imide-quat −60 |
| Yellow Pigment YP200 | CCA Functionality Zeta Charge (mV) | 111 amide-quat −60 | 117 ester-quat −86 | 120 imide-quat −170 |

The molecular structure of CCAs 1124-89, 106, and 111 are represented by Formula XVIII. The molecular structure of CCAs 113 and 117 are represented by Formula XIX. The molecular structure of CCA 116 is represented by Formula XX. The molecular structure of CCA 118 is represented by Formula XXI. The molecular structure of CCA 119 is represented by Formula XXII. The molecular formula of CCA 120 is represented by Formula XXIII. The molecular formula of CCA 122 is represented by Formula XXIV.

Formula XVIII

Formula XIX wherein P(RA) is poly(ricinoleic acid)

Formula XX wherein P(RA) is poly(ricinoleic acid)

Formula XXI wherein P(IB) is poly(isobutylene)

Formula XXII

Formula XXIII

Formula XXIV

Example 2

Zeta potential measurements were again performed using three different dispersions containing yellow pigment particles (YP190) dispersed in Isopar E and either one or two CCAs from Example 1. In the first dispersion sample, a CCA having an ester group as ancillary functionality (CCA 113) was gradually added to the pigment dispersion, and the zeta potential measured after each addition. In the second sample, a CCA having an acyclic secondary amide group (CCA 106) was gradually added to the pigment dispersion, and the zeta potential measured after each addition. In the final sample, a 50:50 blend of CCA 113 and CCA 106 was gradually added, and the zeta potential measured after each addition. The zeta potential of the dispersions was again measured using a Colloidal Dynamics AcoustoSizer II and ZetaProbe.

Figure 1:
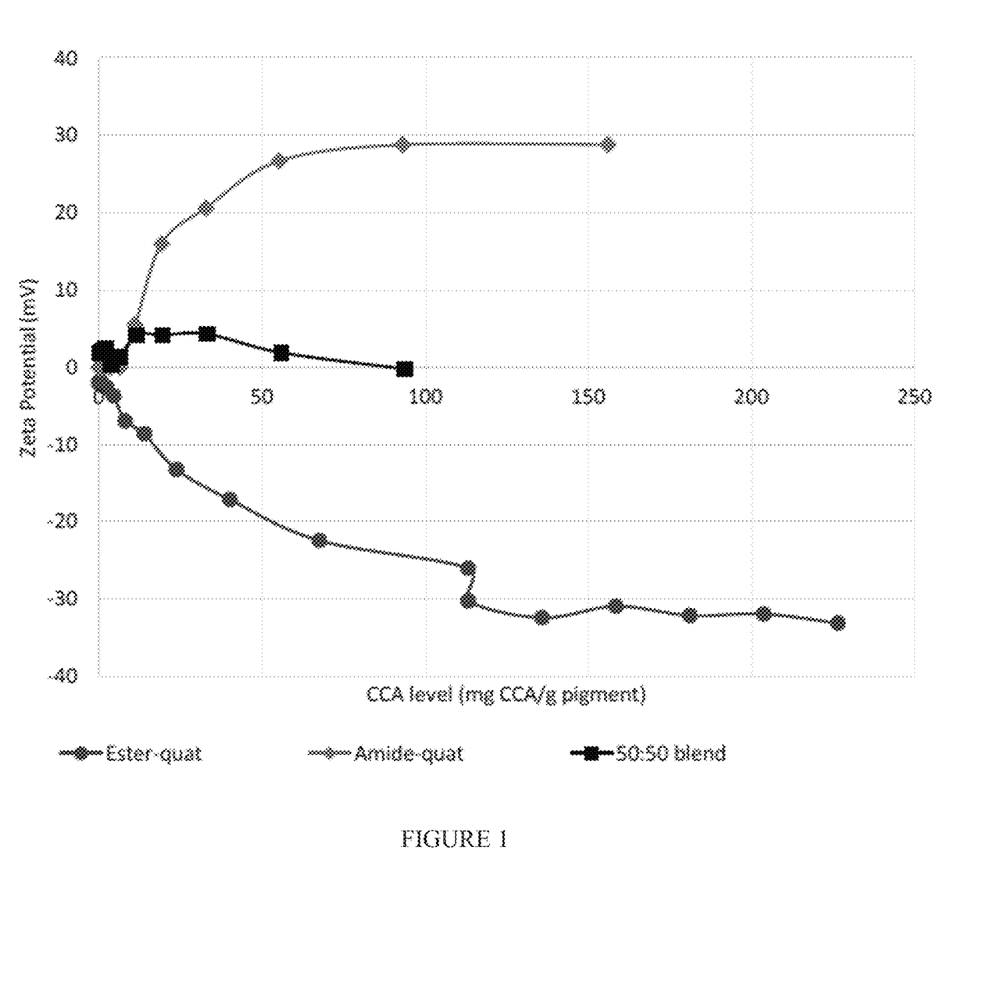
FIG. 1 is a graph illustrating the change in zeta potential for particles combined with varying amounts of a charge control agent containing an ester group as ancillary functionality according to an embodiment of the present invention vs. a charge control agent containing an acyclic secondary amide group and 50:50 blends of the two.

As illustrated in FIG. 1, the CCA containing an acyclic secondary amide group charged the yellow pigment to +29 mV while the CCA containing ester functionality charged the yellow pigment to −32 mV. Utilizing a 50:50 blend of the two CCAs resulted in an average zeta potential that was slightly positive demonstrating the ability to provide greater control of the charge imparted to the particles through simple blending.

Example 3

Three dispersion samples were prepared containing four types of pigment particles (WH93 white, CP207 cyan, YP190 yellow, MP170 magenta) and a charge control agent (s). The first dispersion contained a purified form of a commercially available CCA containing an acyclic secondary amide group. The second dispersion contained one of the CCAs from Example 1 containing an acyclic secondary amide group (CCA 106). The final dispersion contained a blend of CCA 106 and a CCA from Example 1 containing an ester group as ancillary functionality (CCA 117).

Figure 2:
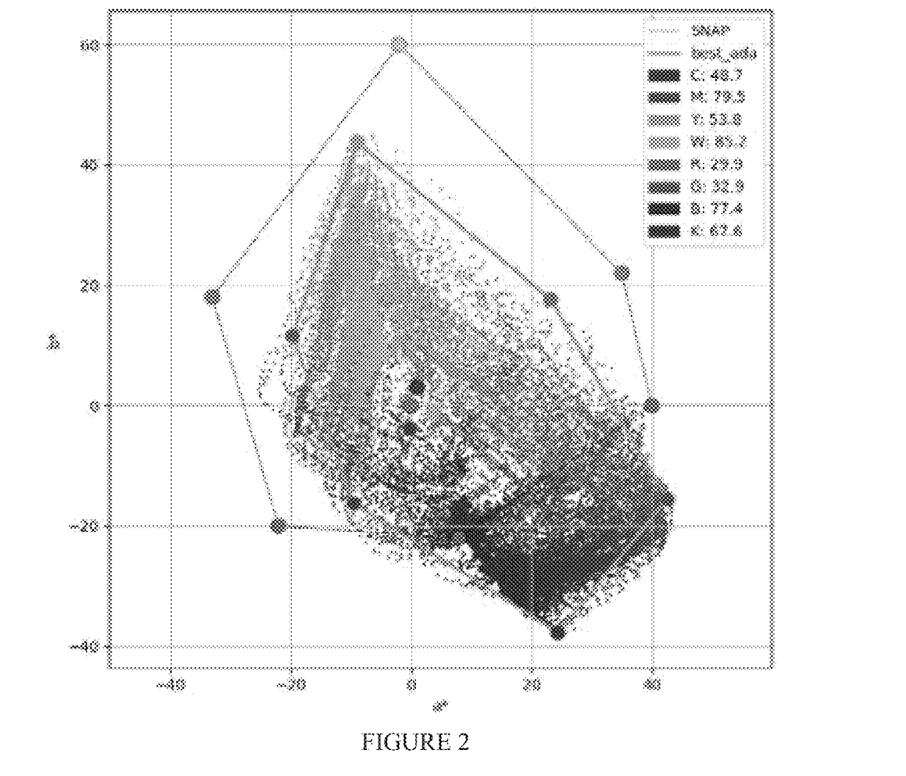
FIGS. 2 and 3 show color gamuts for a dispersion containing a plurality of color particles and a charge control agent containing an acyclic secondary amide group.
Figure 3:
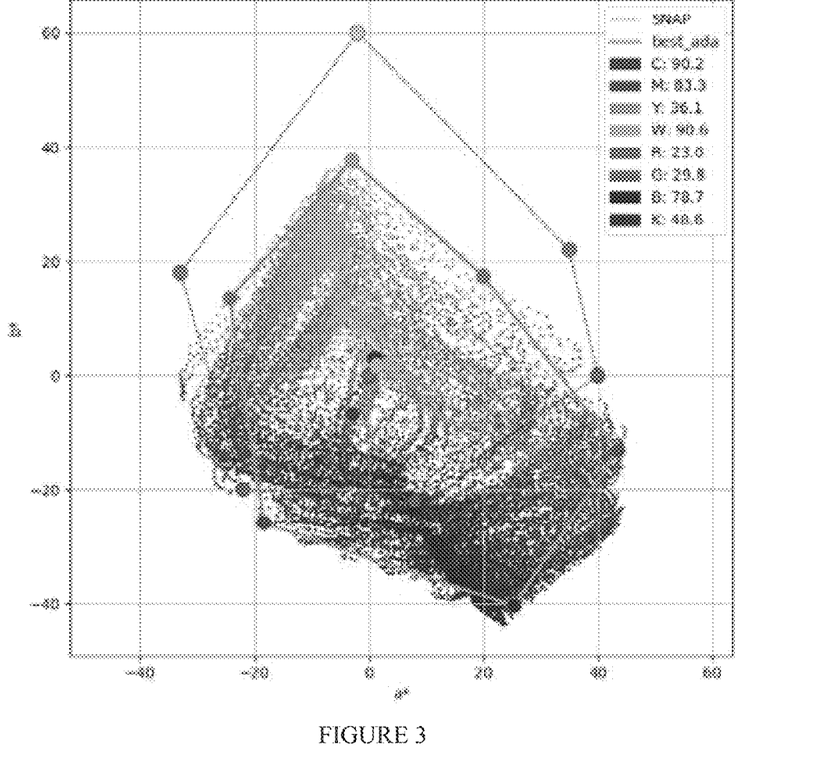
Figure 4:
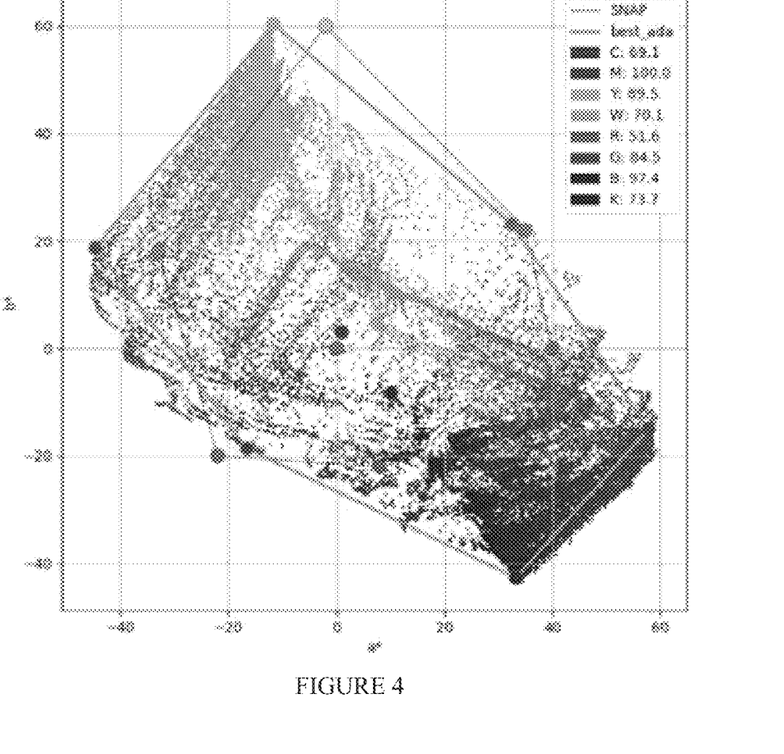
FIG. 4 shows a color gamut for a dispersion containing the plurality of color particles of FIGS. 2 and 3 and a blend of a charge control agent containing an ester group as ancillary functionality and a charge control agent containing an acyclic secondary amide group.

The prepared dispersions were encapsulated and used in electrophoretic medium layers for corresponding electrophoretic displays. Each display was electrically driven to generate various optical states, the reflection spectra of which were acquired using a spectrophotometer. CIE L*, a* and b* values of the reflected light from each electrophoretic display were measured. For each spectral sample, the minimum distance in L*a*b* space of the color of the display from each of the eight SNAP (Specifications for Newsprint Advertising Production) color standard primaries was calculated in units of ΔE*. The full color gamut from all measured points was also extracted. The primary colors were red, green, blue, yellow, cyan, magenta, white and black (R, G, B, Y, C, M, W, and K). The lower the distance, the closer is the performance of the electrophoretic display to the SNAP target, indicating better color saturation of the optical state of the display. The results are summarized in FIGS. 2, 3, and 4. The solid line of the figures correspond to the gamut of the electrophoretic displays tested, whereas the dotted lines correspond to the SNAP standard gamut. It is apparent from the gamut plots that utilizing a blend of charge control agents having (a) a charge control agent comprising an acyclic secondary amide group and a quaternary ammonium group in its molecule and (b) a charge control agent comprising an ester group and a quaternary ammonium group in its molecule, provides a broader gamut to the system containing only the charge control agents having an acyclic secondary amide group and a quaternary ammonium group in its molecule. Specifically, color improvements in the red-yellow-green space were achieved while maintaining comparable performance in the other color regions.

While preferred embodiments of the invention have been shown and described herein, it will be understood that such embodiments are provided by way of example only. Numerous variations, changes, and substitutions will occur to those skilled in the art in the specific embodiments of the invention described above without departing from the scope of the invention. Accordingly, the whole of the foregoing description is to be interpreted in an illustrative and not in a limitative sense.

All of the aforementioned patents and patent applications are incorporated by reference herein in their entireties.

We claim:

1. An electro-optic display comprising a light transmissive electrically-conductive layer, a layer comprising a dispersion, and a substrate comprising one or more electrodes, wherein the layer comprising the dispersion is disposed between the light transmissive electrically-conductive layer and the substrate, wherein the light transmissive electrically-conductive layer and the substrate are configured to apply an electric field to the layer comprising the dispersion, and wherein the dispersion comprises a fluid and a mixture comprising a plurality of charged particles, and a first charge control agent, the first charge control agent comprising an ammonium cation and having a chemical structure represented by Formula XVI, or Formula XVII;

Formula XVI

-continued

Formula XVII wherein HT of Formula XVI and Formula XVII is a hydrophobic moiety comprising a functional group selected from the group consisting of poly(hydroxystearic acid), poly (ricinoleic acid), and poly(isobutylene), and
wherein the first charge control agent has a weight average molecular weight greater than 1000 g/mol.

2. The electro-optic display of claim 1, further comprising a second charge control agent, wherein the second charge control agent comprises a hydrophobic moiety and a head group selected from the group comprising an anionic functional group, a nonionic functional group, and a cationic functional group.

3. The electro-optic display of claim 2, wherein the second charge control agent comprises an ammonium cation, an acyclic secondary amide group, and a hydrophobic moiety.

4. The electro-optic display of claim 3, wherein the second charge control agent is represented by Formula XV;

Formula XV wherein each $R_{21}$, $R_{22}$, $R_{23}$ is independently selected from the group consisting of an alkyl group and an aryl group;
wherein v is an integer less than or equal to 20; and
wherein HT is a hydrophobic moiety.

5. The electro-optic display of claim 4, wherein the hydrophobic moiety HT of Formula XV comprises a functional group selected from the group consisting of poly (hydroxystearic acid), poly (ricinoleic acid), poly (isobutylene), and an unbranched or a branched alkyl group, wherein the unbranched or the branched alkyl group comprises from about 10 to about 35 carbon atoms.

6. The electro-optic display of claim 1, wherein the hydrophobic moiety HT of Formulas XVI and XVII is derived from a monomer selected from the group consisting of ricinoleic acid, isobutylene, and combinations thereof.

7. The electro-optic display of claim 1, wherein the plurality of charged particles are capable of moving through the fluid upon application of an electric field.

8. The electro-optic display of claim 1, wherein the layer comprising the dispersion comprises a binder and a plurality of capsules, wherein each capsule contains the dispersion.

* * * * *